United States Patent [19]

Wilson

[11] 3,815,029

[45] June 4, 1974

[54] BURST PHASE SHIFT KEYED RECEIVER

[75] Inventor: Dennis L. Wilson, Palo Alto, Calif.

[73] Assignee: The United States of America as represented by the Secretary of the Air Force, Washington, D.C.

[22] Filed: Jan. 29, 1973

[21] Appl. No.: 327,360

[52] U.S. Cl. .................. 325/320, 178/66 R, 178/88

[51] Int. Cl. .............................................. H04l 27/22

[58] Field of Search............ 325/320; 178/66 R, 67, 178/88

[56] References Cited

UNITED STATES PATENTS

| | | | |
|---|---|---|---|
| 3,609,550 | 9/1971 | Guyer | 178/67 X |
| 3,739,277 | 6/1973 | Schneider et al. | 325/320 X |

*Primary Examiner*—Richard Murray
*Assistant Examiner*—Aristotelis M. Psitos
*Attorney, Agent, or Firm*—Harry A. Herbert, Jr.; Julian L. Siegel

[57] ABSTRACT

A burst phase shift keyed receiver which detects, synchronizes and demodulates a phase shift key signal which has an additional 180° phase shift in the center of each transmitted bit. A two-stage sample and hold register is fed by the front end of the receiver and triggered at twice the bit rate, the output of each stage, in opposition to each other, are added, thereshold compared, gated with a delayed bit rate synchronizing signal and fed to a shift register that is enabled by a Barker code. The delayed bit synchronizing pulses are achieved by forming two sums of the outputs of the two stages of the sample and hold register, one sum being both the positive outputs and the other sum being the outputs of opposite phase. The two sums are full wave rectified and fed to a comparing threshold circuit, the output thereof feeding a pair of AND gates which are also fed by opposite phases of a divide-by-two flip-flop that is triggered by a delayed 2 times the bit rate signal. The AND gates trigger up or down a counter whose output is threshold detected and fed to a switch together with opposite phases of the flip-flop. The Barker code synchronizing signal is achieved by feeding the output of the front end to a threshold circuit, then to a serial in-parallel out shift register, adding the parallel outputs, full wave rectifying, and threshold detecting the sums.

3 Claims, 9 Drawing Figures

BURST PHASE SHIFT KEYED RECEIVER

BACKGROUND OF THE INVENTION

This invention relates to digital communication systems, and more particularly to a burst phase shift keyed receiver.

There are many situations in which a short message must be delivered via a radio frequency link. An example of such a situation is the communication of an alarm from a remote sensor. The communication must convey the identity of the sensor plus additional information about the operation of the sensor and the cause of the communication. The resulting message may contain 25–30 bits or about five words of information as the usual communication is measured. In such a situation, much of the operation of the receiver may be devoted to detecting a signal and synchronizing with the signal. In a serious case, more time may be devoted to preparing to receive the message than in the actual reception.

It is the purpose of the burst phase shift keyed (PSK) receiver to detect the presence of a signal and prepare for the reception of the signal using the minimum possible amount of time. In addition, the receiver is to operate at nearly the ideal theoretical optimum performance.

SUMMARY OF THE INVENTION

The input to the receiver is conditioned by the receiver front-end. The basic demodulation circuit demodulates the signal with the aid of inputs from the other portions of the receiver. Bit synchronization is established by the bit synchronization circuits in conjunction with the output of a bit synchronization phase-locked loop in the front-end. Finally, the beginning of the message is marked and the active demodulation is begun when a Barker code is detected in the Barker code synchronization generator.

It is therefore an object to provide a method and system for detecting, synchronizing and demodulating a message from a remote sensor.

It is another object to provide a burst phase shift keyed receiver that locks on and prepares for reception in faster time than that in the past.

These and other objects, features and advantages of the invention will become more apparent from the following description taken in connection with the illustrative embodiment in the accompanying drawings.

DETAILED DESCRIPTION OF THE PREFERRED EMBODIMENT

Figure 1:
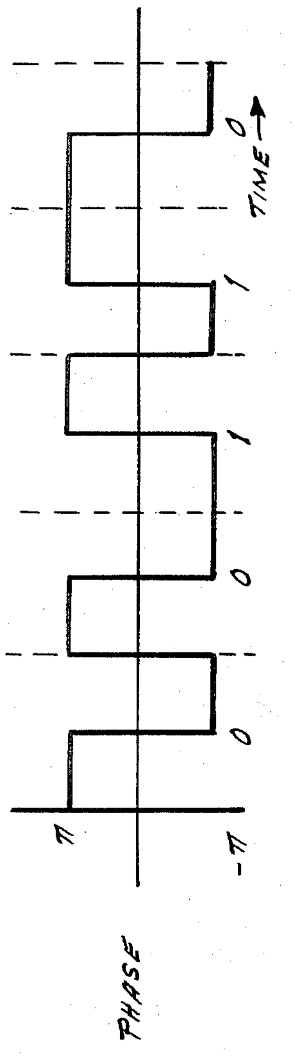
FIG. 1 is a waveform diagram showing the transmitter output wave form used in the invention.

In order to perform the locking operation as quickly as possible, the signal that is used with the receiver is not the usual PSK signal where the phase changes only at the bit timing points. The signal has an additional 180° phase shift in the middle of each transmitted bit. FIG. 1 illustrates a possible waveform for the signal from the output of the transmitter.

Figure 2A:
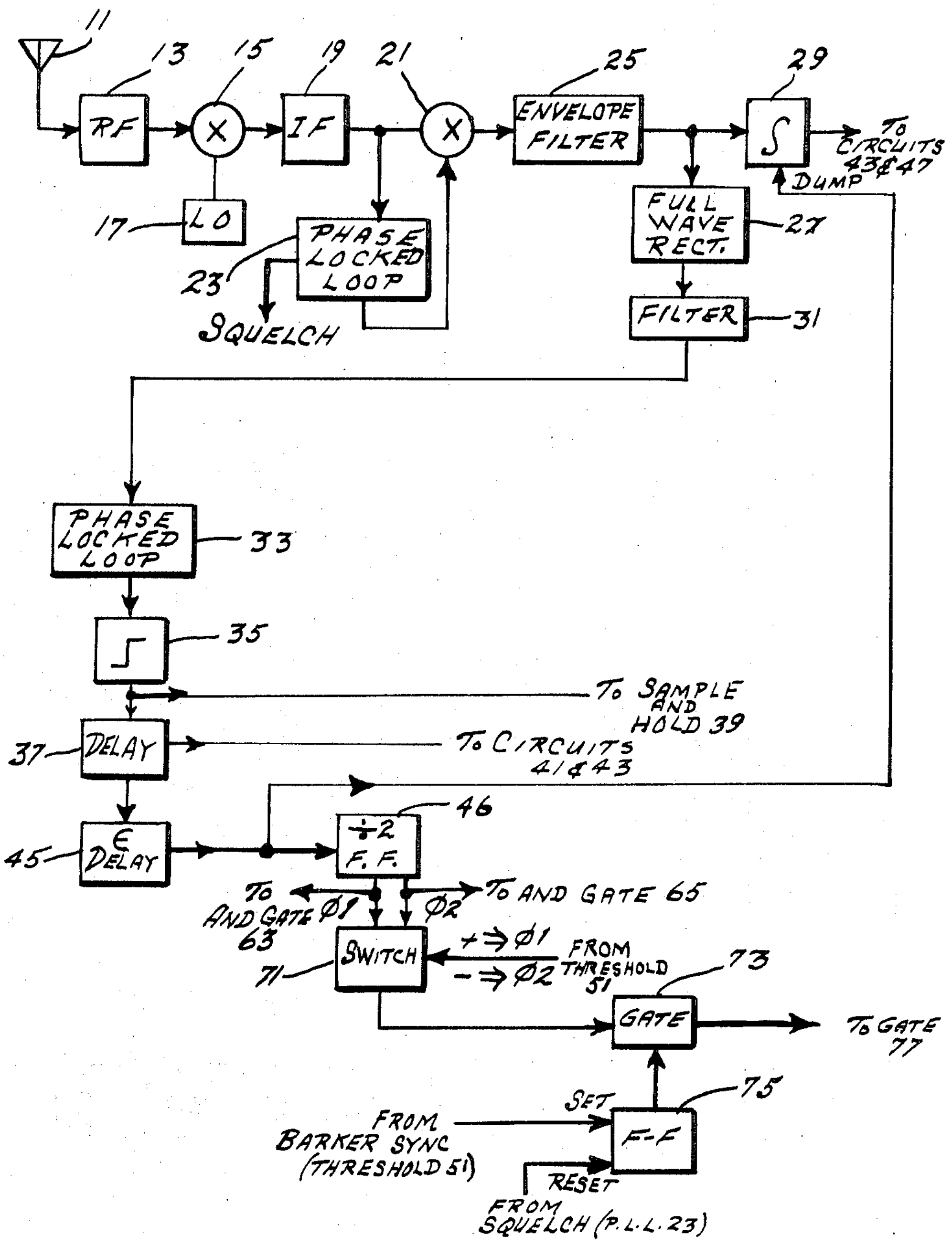
FIG. 2 is a block diagram of the burst phase shift keyed receiver.
Figure 2B:
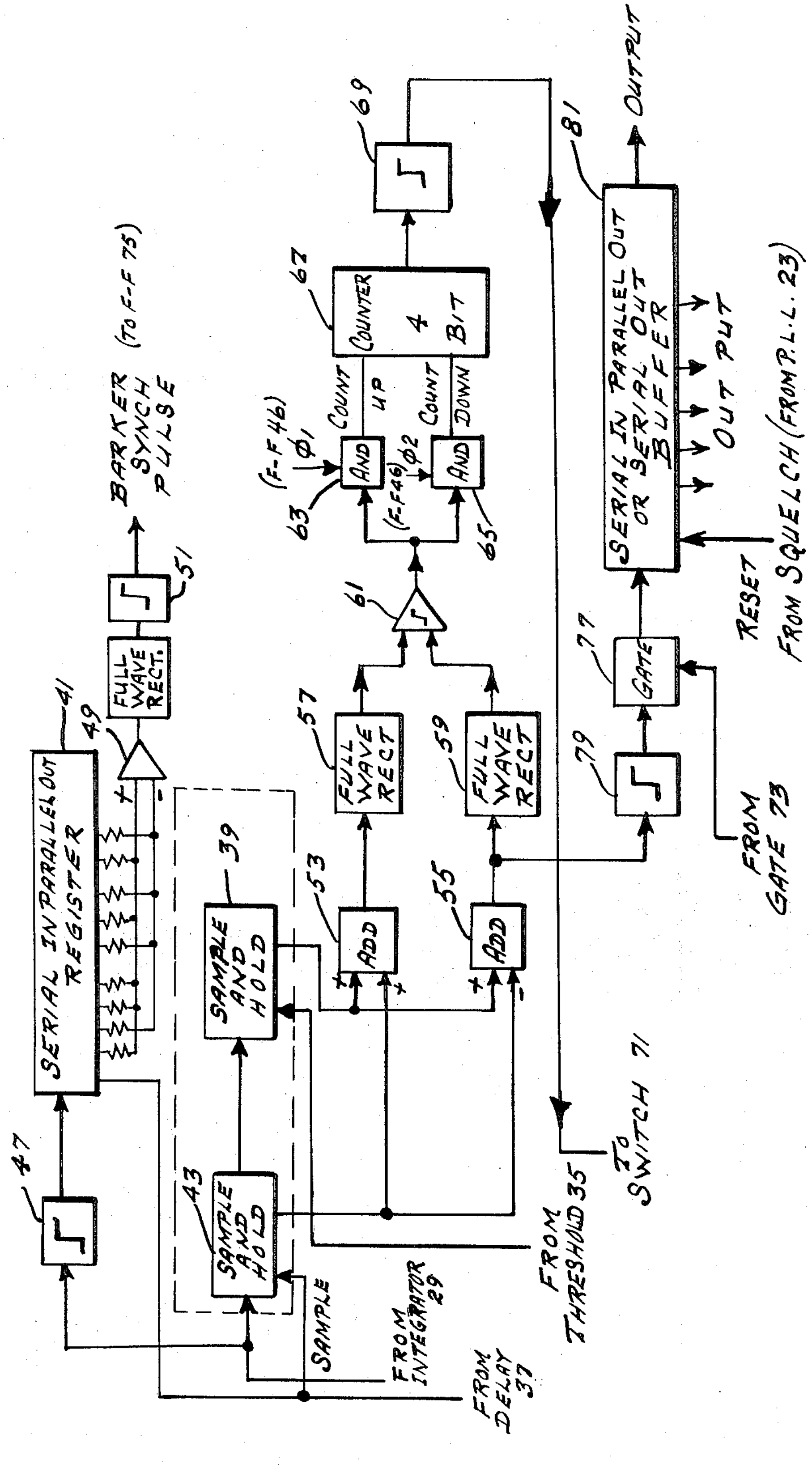

Referring to FIGS. 2*a* and 2*b*, there is shown a general block diagram of the receiver. The signal is received at antenna 11 and is amplified by RF amplifier 13 which is then fed to mixer 15 where it is mixed with the signal from local oscillator 27. The resultant IF signal is amplified by IF amplifier 19 which feeds directly to mixer 21 and also indirectly via phase lock loop 23. The output of mixer 21 is fed to envelope filter 25 and then to full-wave rectifier 27 and integrator 29. The rectified signal is then fed via filter 31 to phase lock loop 33 and then threshold detector circuit 35 where it has two outputs, one to delay 37 and the other to sample and hold circuit 39. The output of delay circuit 37 is fed to register 41 and sample and hold circuit 43 and also to delay circuit 45, the output thereof becoming the dump signal for integrator 29 which then feeds register 41 via threshold circuit 47. Delay circuit 45 also feeds flip-flop 46 which divides by 2 and has two outputs, $\phi_1$ and $\phi_2$. The parallel outputs of register 41 are amplified by amplifier 49 and fed to threshold circuit 51 where the output is a Barker code synchronization pulse. The outputs of sample and hold circuits 39 and 43 are added in adders 53 and 55, rectified in full-wave rectifiers 57 and 59, fed to amplifier 61 and then to AND gates 63 and 65 which are also fed by $\phi_1$ and $\phi_2$ from flip-flop 46. The outputs of AND circuits 63 and 65 are count up and count down inputs for counter 67 which feeds threshold circuit 69 which then controls switch 71 that is also fed by $\phi_1$ and $\phi_2$ from flip-flop 46. The output from switch 71 is fed to gate 73 which is enabled by flip-flop 75 that is set from the Barker code synchronization pulse from threshold 51 and reset by the squelch pulse from phase lock loop 23. The output of gate 73 is fed to gate 77 enabled by adder 55 via threshold circuit 79. Gate 77 feeds buffer register 81 which can have either a serial or parallel output and is reset from the squelch pulse from phase lock loop 23.

Figure 3:
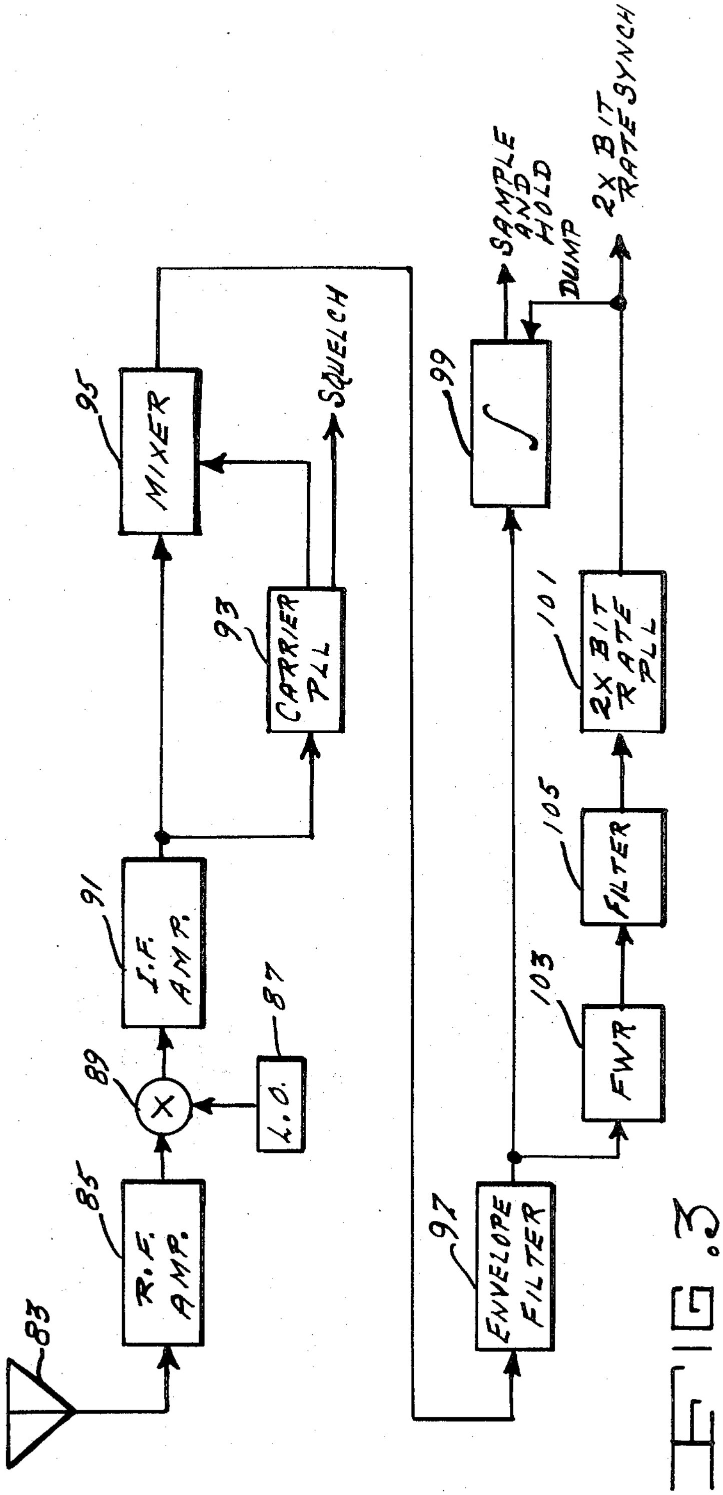
FIG. 3 is a detailed block diagram showing the front-end of the burst PSK receiver.

The block diagram of the front-end is shown in FIG. 3. The front-end consists of antenna 83 feeding RF amplifier 85 which together with oscillator 87 drives mixer 89, the output thereof which is amplified in IF amplifier 91. The circuit which establishes the synchronization with the carrier phase is the carrier phase-locked loop 93 fed by IF amplifier 91. The synchronized carrier is fed to mixer 95 to perform coherent demodulation of the IF signal. The output of the mixer has the energy at frequencies near the carrier removed by envelope filter 97. The first step of the demodulation of the signal is performed by dumping integrator 99 following filter 97. The dump pulse for integrator 99 is supplied by a second phase-locked loop 101 which generates synchronization at twice the bit rate. The phase-locked loop receives signals from envelope filter 97 via full wave rectifier 103 and filter 105.

Figures 4, 5, 6:
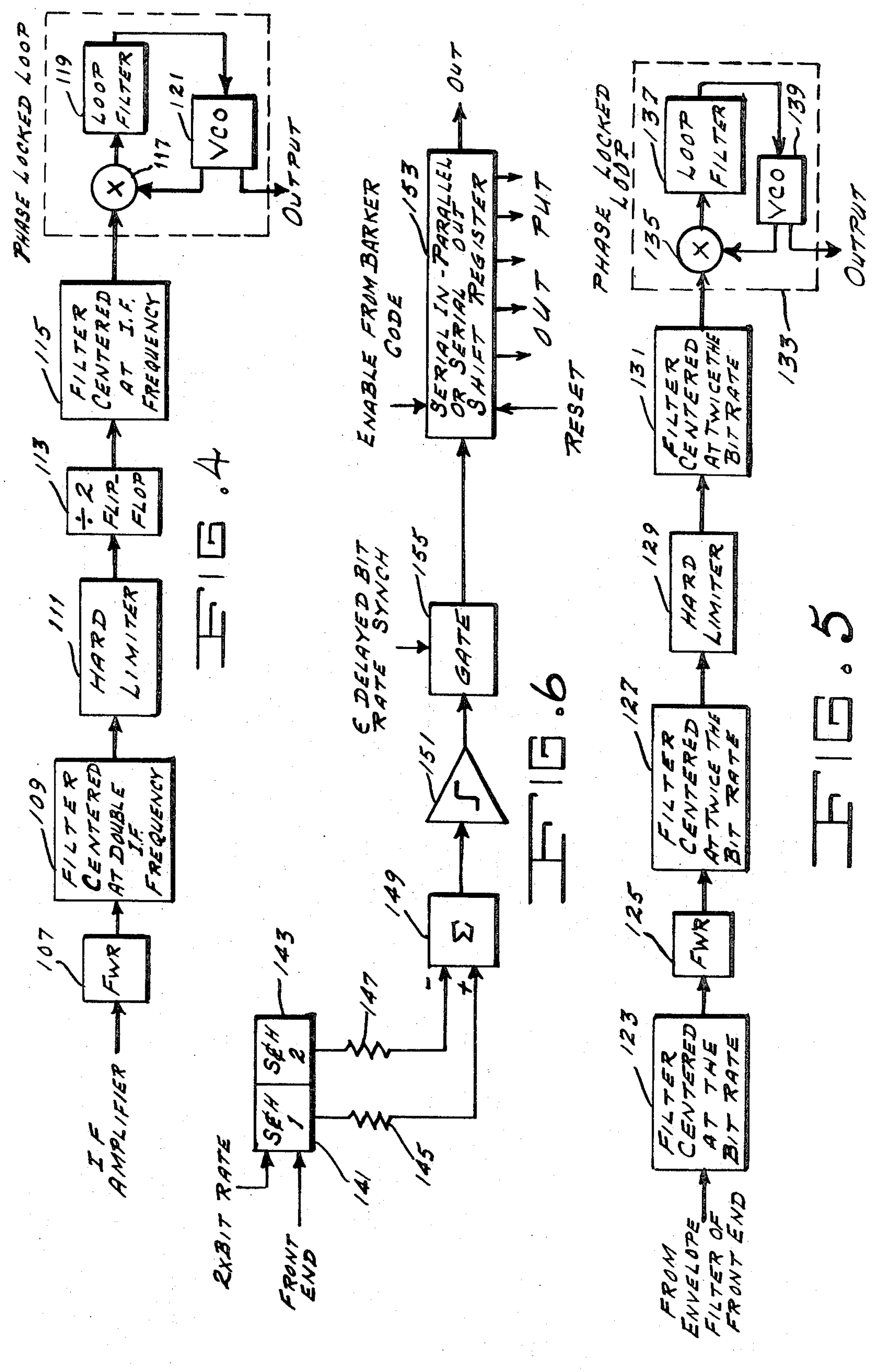
FIG. 4 is a detailed block diagram showing the phase lock loop for carrier synchronization.
FIG. 5 is a detail block diagram showing the phase lock loop for bit timing.
FIG. 6 is a detail block diagram showing the basic operation of converting a signal taken from the front-end into the demodulated message in a buffer register.

The details of the circuits associated with the phase-locked loop which establishes the carrier synchronization are shown in FIG. 4. The signal from the output of the IF amplifier 91 is doubled in frequency by passing the signal through full wave rectifier 107 and filter 109 centered at twice the frequency of the carrier. Frequency doubling is necessary to generate a carrier where there was none with the original PSK signal. The output of the frequency doubler is passed through hard-limiter 111 then flip-flop 113. Hard-limiter 111 normalizes the amplitude at the input to the phase-locked loop to reduce the dynamic range and to establish a fixed-phase gain in the phase-locked loop. The output of hard-limiter 111 is divided by two in the flip-flop 113 to reduce the band of frequencies over which the loop must search and to maintain the operation of the remainder of the phase-locked loop circuits at the carrier frequency and then fed to filter 115 which is centered at the IF frequency. The output of filter 115 is fed to mixer 117 and then to filter 119 or phase detector followed by voltage controlled oscillator 121 which is returned to mixer 117. The output of voltage controlled oscillator 121 is a constant frequency signal locked to the carrier frequency of the PSK signal.

The detail of the circuits associated with the operation of the phase-locked loop which establishes the doubled bit synchronization is shown in FIG. 5. The output of the envelope filter is passed through filter 123 centered at the bit rate and then full wave rectifier 125 and followed by filter 127 centered at twice the bit rate to double the frequency of the signal from the output of the envelope filter. This signal is passed through bandpass hard-limiter 129, another filter centered at twice the bit rate, and then into the phase-locked loop 133. Phase-locked loop 133 consists of mixer 135 and filter 137 followed by voltage controlled oscillator 135 arranged in a feedback loop. The output of the voltage controlled oscillator 139 will be a signal, phase-locked to the transitions of the phase of the incoming signal. Since that signal will have phase transitions at twice the bit rate, the phase-locked loop will be locked in phase to the bit timing but at twice the bit rate. In order to fully establish the bit timing, it is necessary to determine which of the phases of the output of the phase-locked loop is the correct phase.

The basic operation of the receiver takes the signal generated by the integrator of the front-end and converts the signal to a demodulated message contained in a buffer register shown in block diagram form in FIG. 6. The first part of the circuit is a pair of interconnected sample-and-hold circuits 141 and 143. At twice the bit rate, synchronized with the doubled bit-rate phase-locked loop, the two sample-and-hold circuits sample their inputs and hold the voltage samples until the next sample pulse appears. The second circuit samples the voltage held by the first circuit. The first circuit samples the voltage of the integrator, and then the integrator is dumped to begin integrating for the next bit.

The output of sample-and-hold circuits 141 and 143 are passed through equal weighting resistors 145 and 147 to adding circuit 149. First sample-and-hold circuit 141 is positively weighted, while second sample-and-hold circuit 143 is negatively weighted. The output of adder 149 is passed through threshold circuit 151 to give a positive output if the output of the adder is positive and a negative output if the output of adder 149 is negative. The decision made by the threshold 151 is valid after both sample-and-hold circuits have settled. The bit synchronization pulse, delayed slightly to allow for the settling time of the sample-and-hold circuits is used to gate the decision of threshold circuit 151 through to buffer register 153 by gate 155.

A pulse from the Barker code synchronization circuit turns on the shift pulse for buffer register 153. An auxiliary counter not shown then counts to the known length of the message when the shift pulse is turned off. Modifications are possible for messages of unknown length. Messages using comma-free codes are particularly easy to use. When the shift pulse is turned off, buffer register 153 will contain the message ready for output either serially or in parallel. The output buffer may be reset externally or may be reset from the output of the squelch circuit or the Barker code synchronization circuits just before a new message is received.

Figure 7:
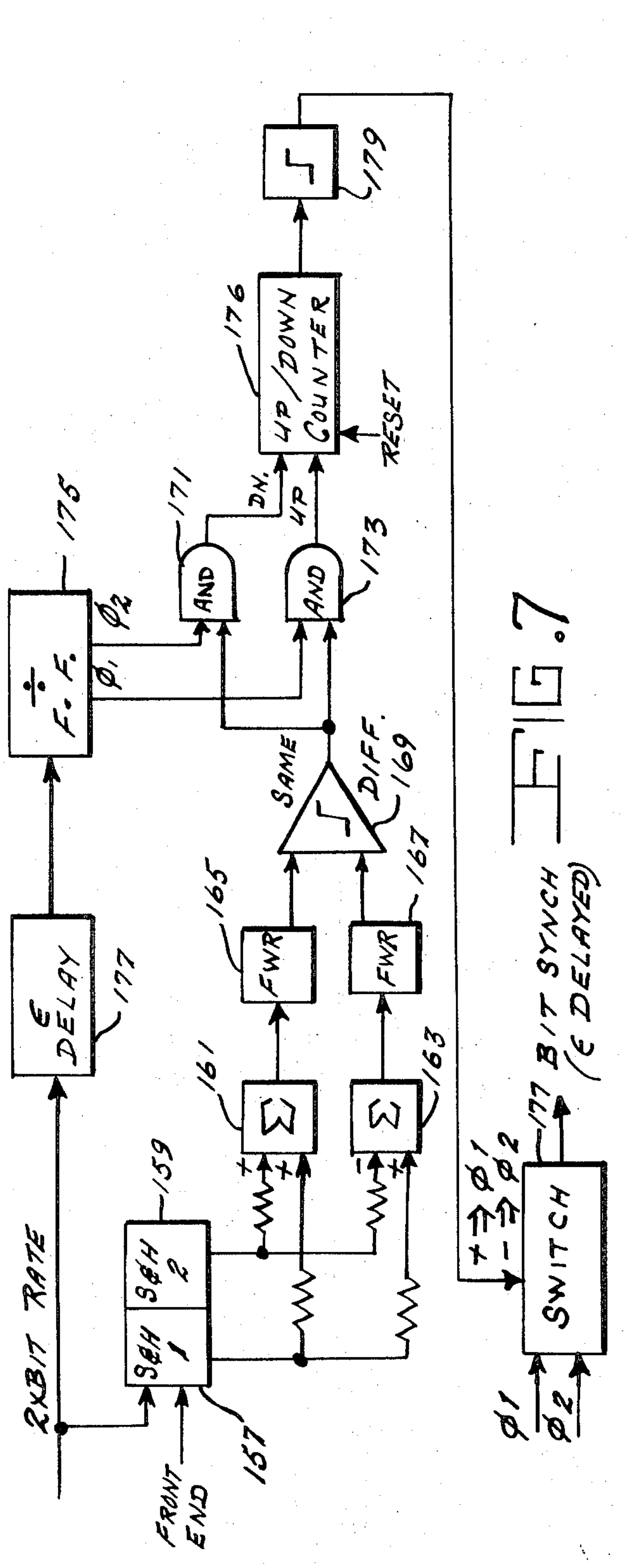
FIG. 7 is a detail block diagram showing bit synchronization from 2 $x$ bit synchronization signals.

The circuits which obtain the bit synchronization from the output of the phase-locked loop locked to twice the bit rate are shown in FIG. 7. Sample-and-hold circuits 157 and 159 of the basic demodulation of the signal are used in the development of the bit synchronization. The output of sample-and-hold circuits 157 and 159 are combined in two different ways. One way uses the plus-minus weighting as used in the demodulation circuit. The second weighting is with both of the sample-and-hold circuits weighted plus. The output of adders 161 and 163 is full wave rectified by rectifiers 165 and 167 and passed through threshold comparator 169. The output of comparator 169 is positive if the output of first adder 161 is larger than the output of second adder 163 in absolute magnitude. The output of comparator 169 is used to drive AND gates 171 and 173. Flip-flop 175 is used to divide the doubled bit rate by two after delay $\epsilon$ by circuit 177. Both phases of the resulting clock pulses are brought out of flip-flop 175 which constitute phase 1 and phase 2 of the clock. It is necessary to determine which of the two phases is the correct phase for the operation of the bit synchronization. The two phases are gated by the output of the comparator 169. When the output of the comparator is positive and the phase 1 clock occurs, counter 176 counts up. When the output of the comparator is positive and the phase 2 clock occurs, counter 176 counts down. When the output of the comparator 169 is negative, no count is added to the counter. Counter 176 is reset to zero at the beginning of a message by the signal from the squelch circuit of the carrier phase-locked loop. The output of counter 176 activates switch 177 via threshold circuit 179.

Figure 8:
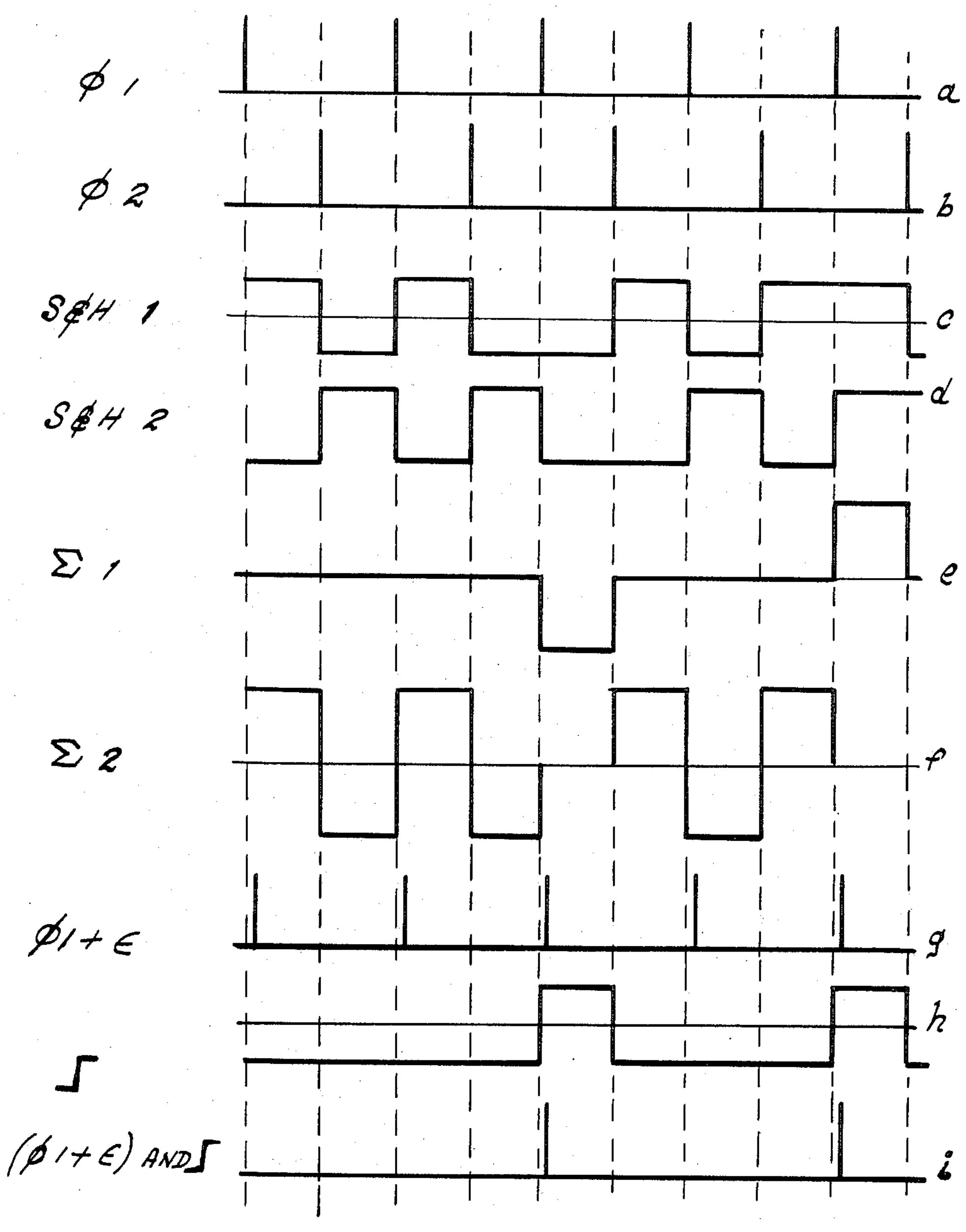
FIG. 8 is a waveform diagram showing various outputs of the receiver.

The operation of the circuits which derive the bit synchronization from twice the synchronization are illustrated by the waveforms in FIG. 8. The first two waveforms a and b are the outputs of the phase 1 and phase 2 clocks derived from flip-flop 175. A possible waveform from the first sample-and-hold circuit is shown as waveform c. The waveform of the second sample-and-hold circuit is shown as waveform d. The waveform of the second sample-and-hold circuit is the same as the waveform of the first sample-and-hold delayed by one time unit. The outputs of the two summers are shown as waveforms e and f. As long as the contents of the two sample-and-hold circuits are of opposite polarity, the output of the first summer is zero. The output of the second summer is zero only when the contents of the two sample-and-hold circuits are the same polarity. The correct phase of the clock will always have both sample-and-hold circuits with opposite polarities, since only during a transition between bits can the polarities be the same. When the outputs of the two summers are rectified, the output of the first summer will be positive only when the rectified output of the second summer is zero. Waveform *g* is the phase 1 clock delayed by a short time $\epsilon$ to allow for settling of the preceding circuits. The output of the comparator is shown as the waveform *h*. The output of the comparator is positive only during the transition immediately following the transition of the information bit from 1 to 0 or from 0 to 1. The AND gate for the first phase will permit a count to occur at the two transitions where the output of the comparator was positive. The AND gate for the second phase will have no time when the phase 2 clock and the output of the comparator are positive at the same time. The AND gate output is shown as waveform *i*. Consequently, the counter will count up at each transition from 1 to 0 or from 0 to 1 in the information bit train. The count will very soon be quite positive and the phase 1 of the clock will be selected, as it should be.

If phase 2 of the clock had been the correct phase, the pulses to the counter would have come from only the AND gate for phase 2 of the clock. The counter, would therefore have have counted only down. Phase 2 would have been selected.

When the input to the receiver has a low signal-to-noise ratio, there is a possibility that the contents of the sample-and-hold circuits will be of the wrong polarity occasionally due to the action of the noise. The result will be occasional counts by the counter in the wrong direction. The much more rapid rate at which the counter counts in the correct direction will move the count into the correct region in spite of the action of the noise until the signal-to-noise ratio falls so low that the demodulation part of the circuit will no longer function correctly. When the demodulator will not function, it is not important that the phase of the clock be correct.

Figure 9:
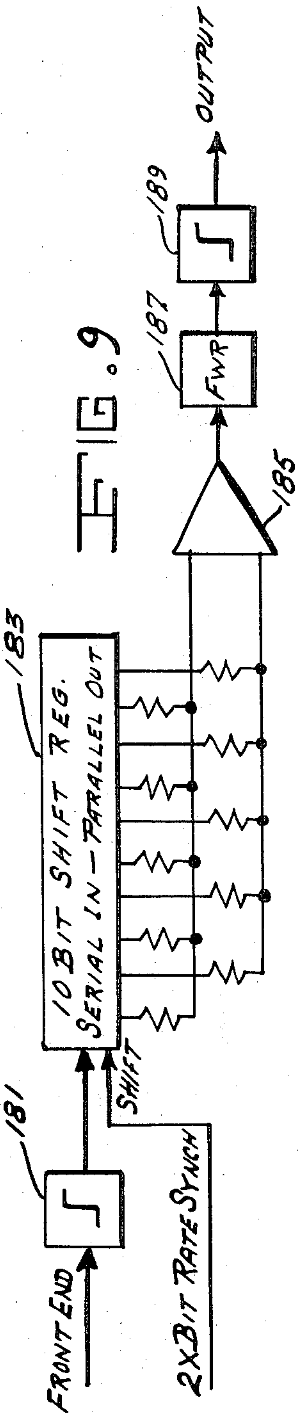
FIG. 9 is a block diagram showing the generation of the Barker code synchronization impulses.

The final circuit of the receiver is the circuit which detects the Barker code and is shown in FIG. 9. The Barker code is the preface to the message which permits the receiver to lock up to the bit timing before it is necessary to begin demodulation of the message. These codes are standard short code with very good correlation characteristics and are discussed in, "Detection, Estimation and Modulation Theory," Part III, pp 316–318, by Harry L. Van Trees (1971). The good correlation characteristics mean that the Barker codes can be used to initiate actions in the receiver reliably due to the ease of determining exactly when the Barker code has been received. The output of the integrator of the front-end is passed through threshold circuit 181 which makes a decision whether the integrator output is positive or negative. In synchronization with the doubled bit rate, the output of threshold 181 is loaded into 10 bit shift register 183. The 10 bit shift register 183 is to be used for a five bit Barker code. Each half bit contained in the register 183 is weighted either plus or minus and added to the other weighted bits. The weights are set to correspond to the Barker code when the Barker code is fully contained in the register and when there are no errors in any of the half bits, the weighting of the bits will be such that either all positive or all negative voltages will be added together to yield an extreme voltage. When the signal is first received, the phase to which the phase-locked loop to the carrier has locked will be unknown. Consequently when the Barker code is in coincidence the output of the register will be an extreme, either negatively or positively. After amplifier 185, full wave rectifier 187 rectifies the signal so that the extreme will always be positive. The threshold is set by circuit 189 so that fewer than the total number of half bits must be correct for coincidence of the Barker code to allow for possible errors in the Barker code as received. For example, the threshold might be set so that coincidence will be indicated when only seven out of 10 half bits correspond to the Barker code.

Before the signal to be received comes up, the receiver will be in a quiescent state. The error voltage in the carrier phase-locked loop will continue to be highly variable because of the action of noise on the loop. Consequently, the squelch circuit will be activated and the remainder of the receiver beyond the front-end will be turned off or otherwise inactivated.

When the carrier of the signal comes on, the carrier phase-locked loop will lock to the doubled carrier and will be ready for operation during the remainder of the message. When the loop locks up, the variability of the error voltage in the loop will decrease below a threshold and will activate the remainder of the circuits in the receiver.

When an initial set of bits arrives in the receiver, say a short string of zeros, the second phase-locked loop will lock to double the bit frequency. The locking time for this loop can be set to be quite small, so that only a few bits are required before the loop locks up. When this loop is locked, the output of the integrator of the front-end will be sampled at the correct time and the front-end will be in the fully operational mode, ready to receive the remainder of the message.

As the Barker code is received, several transitions from 1 to 0 and back will occur. These transitions will be adequate to supply three or four counts to the counter which determines the correct phase of the bit timing clock from the output of the double bit rate locked loop. Three of four counts will set the counter so that the threshold is crossed in the correct direction, and the correct phase will be selected by the switch.

At the end of the Barker code, all of the half bits belonging to the Barker code will be contained in the Barker code register. When coincidence with the weighting function occurs, the Barker coincidence circuit will emit a pulse which will turn on the shift pulse for the buffer register and will reset the register counter to zero. The reception of the Barker code does not depend upon the correct phase of the double bit timing having been selected. Consequently the phase selection circuit can take until the end of the Barker code to select the correct phase.

The message starts at the end of the Barker code which will be a coherently demodulated with a theoretical performance equivalent to the performance of the ideal PSK receiver. All of the phase-locked loops will be locked before the message starts. The Barker code coincidence will indicate reliably when the message starts down to signal-to-noise ratios which are small enough that the error rate of the message will be unacceptably high. The parameters of the phase-locked loops should be established such that the signal-to-noise ratio in the loop bandwidth is at least 15 db at the lowest signal-to-noise ratio at which the receiver is to operate. Under these conditions, the phase jitter from the phase-locked loops will be small enough to cause negligible degradation of the performance of the receiver from the ideal PSK performance. All other performance degradation from the ideal should be due to imperfect operation of the circuits.

It is claimed:

1. A burst phase shift key receiver for receiving a message derived from a transmitted signal having a carrier and having 180° phase shift in the middle of each transmitted bit comprising:

a. means for generating a signal synchronized with the carrier of the transmitted signal;
b. an envelope filter fed by the means for generating a synchronized signal;
c. an integrator fed by the envelope filter;
d. means for generating pulse signals having a frequency of twice the bit rate of the transmitted signal;
e. a sample-and-hold register including first and second sample and hold circuits serially interconnected, the sample-and-hold register being fed by the integrator and pulsed by the twice the bit rate generating means;
f. a first adder fed by the first and second sample-and-hold circuits;
g. a first threshold circuit fed by the first adder;
h. means for generating bit synchronization pulses fed by said means for generating pulse signals having a frequency of twice the bit rate of the transmitted message;
i. a gate fed by the threshold circuit and enabled by the means for generating bit synchronization pulses;
j. means for generating Barker code synchronization pulses fed by the integrator; and
k. a buffer register fed by the gate circuit and enabled by the Barker code generating means, the output of the buffer register being the received message.

2. A burst phase shift key receiver according to claim 1 wherein the means for generating bit synchronization pulses comprises in addition to the said first and second sample-and-hold circuits and the first adder:

a. a second adder fed by the first and second sample-and-hold circuits;
b. a pair of full wave rectifiers fed by one each of the first and second adders;
c. a comparing circuit fed by the pair of full wave rectifiers;
d. a pair of AND gates fed by the comparing circuit;
e. a divide-by-two flip-flop fed by the twice the bit rate generating means and having a pair of outputs in opposite phase enabling one each of the pair of AND gates;
f. an up-down counter fed alternatively by the pair of AND gates;
g. a threshold comparator circuit fed by the up-down counter; and
h. a switch fed by the threshold comparator and activated by the pair of outputs from the divide-by-two flip-flop.

3. A burst phase shift key receiver according to claim 2 wherein the Barker code synchronizing means comprises:

a. a third threshold circuit fed by said integrator;
b. a shift register fed by the third threshold circuit and fed by the twice the bit rate generating means and having a plurality of positive and negative parallel otuputs;
c. means for adding positive outputs and adding negative outputs of the shift register;
d. a full wave rectifier fed by the adding means; and
e. a fourth threshold circuit fed by the full wave rectifier.

* * * * *